United States Patent
Parks et al.

(10) Patent No.: US 7,152,421 B2
(45) Date of Patent: Dec. 26, 2006

(54) HEATING AND COOLING SYSTEM

(76) Inventors: Gary L. Parks, 8817 Stonefort Rd., Creal Springs, IL (US) 62922; Gary W. Rossin, 8984 Herein Rd., Johnson City, IL (US) 62951

( * ) Notice: Subject to any disclaimer, the term of this patent is extended or adjusted under 35 U.S.C. 154(b) by 83 days.

(21) Appl. No.: 10/950,139

(22) Filed: Sep. 25, 2004

(65) Prior Publication Data

US 2005/0076666 A1    Apr. 14, 2005

Related U.S. Application Data

(60) Provisional application No. 60/505,722, filed on Sep. 25, 2003.

(51) Int. Cl.
*F25B 27/02* (2006.01)
(52) U.S. Cl. ........................ 62/236; 62/323.1
(58) Field of Classification Search ............... 62/236, 62/262, 263, 323.1, 323.4, 324.1, 324.6
See application file for complete search history.

(56) References Cited

U.S. PATENT DOCUMENTS

| | | | | |
|---|---|---|---|---|
| 2,363,974 A | * | 11/1944 | Kirkpatrick | 62/302 |
| 2,480,510 A | * | 8/1949 | Roper | 62/244 |
| 2,918,806 A | * | 12/1959 | Krause, Jr. | 62/239 |
| 2,926,504 A | * | 3/1960 | Hellinger | 62/236 |
| 3,646,773 A | * | 3/1972 | Falk et al. | 62/160 |
| 3,692,100 A | * | 9/1972 | Gallagher, Jr. | 165/256 |
| 3,871,188 A | * | 3/1975 | Vold et al. | 62/298 |
| 5,123,257 A | * | 6/1992 | Anderson et al. | 62/236 |

* cited by examiner

*Primary Examiner*—William E. Tapolcai
(74) *Attorney, Agent, or Firm*—Paul M. Denk

(57) ABSTRACT

A heating and cooling system incorporates a heat pump that operates conventionally with air drawn from outside the system through its condenser coils that remove heat to the exterior for cooling. In the heating cycle, the condenser motor blower stops and reverses rotation. Outside air is drawn in by the condenser fan, is circulated across the diesel engine and generator, and is blown through the condenser coils outside of the unit. In the heating cycle, a circuit monitors the temperature of the compressor coil and controls the speed of the condenser motor. The heat recovery method of the system maintains power input to heat output ratios in excess of 2:1, even at low outside temperatures. The recovery method also allows the system to operate without defrost cycles. This system may provide auxiliary power, block heat, and battery charging, utilizing a small diesel engine and generator components, and can be installed within a truck, bus, boat, cabin, camper, and the like.

8 Claims, 8 Drawing Sheets

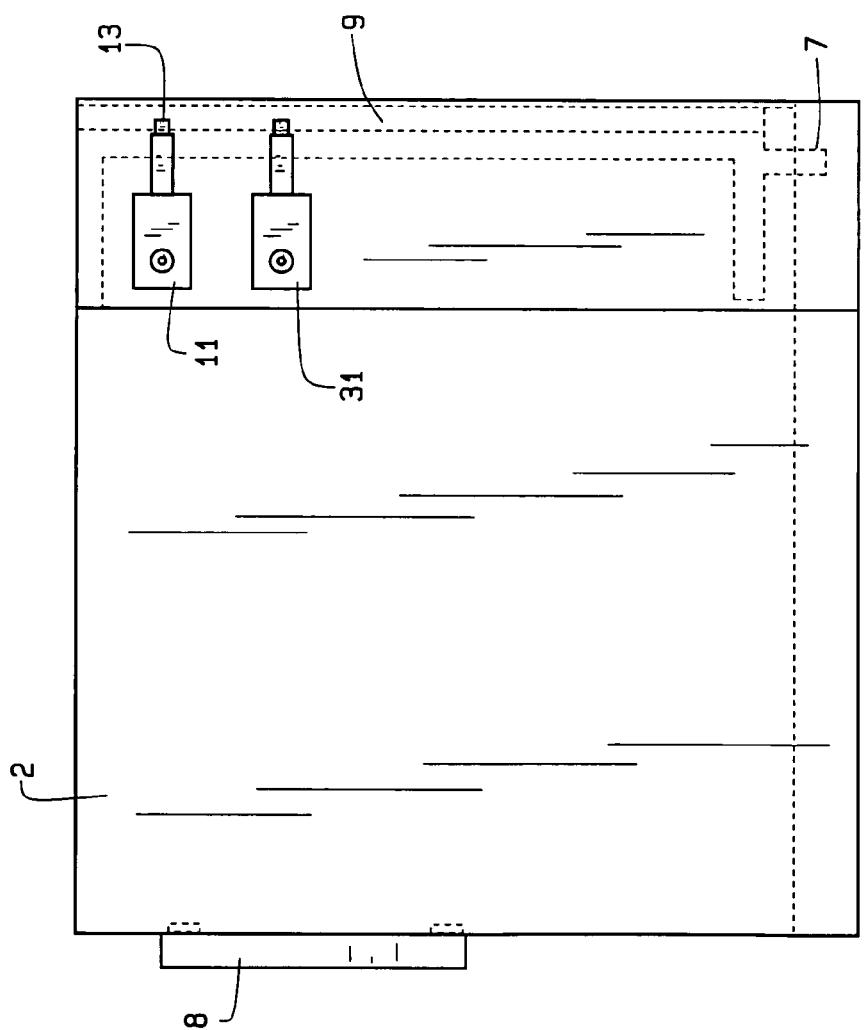

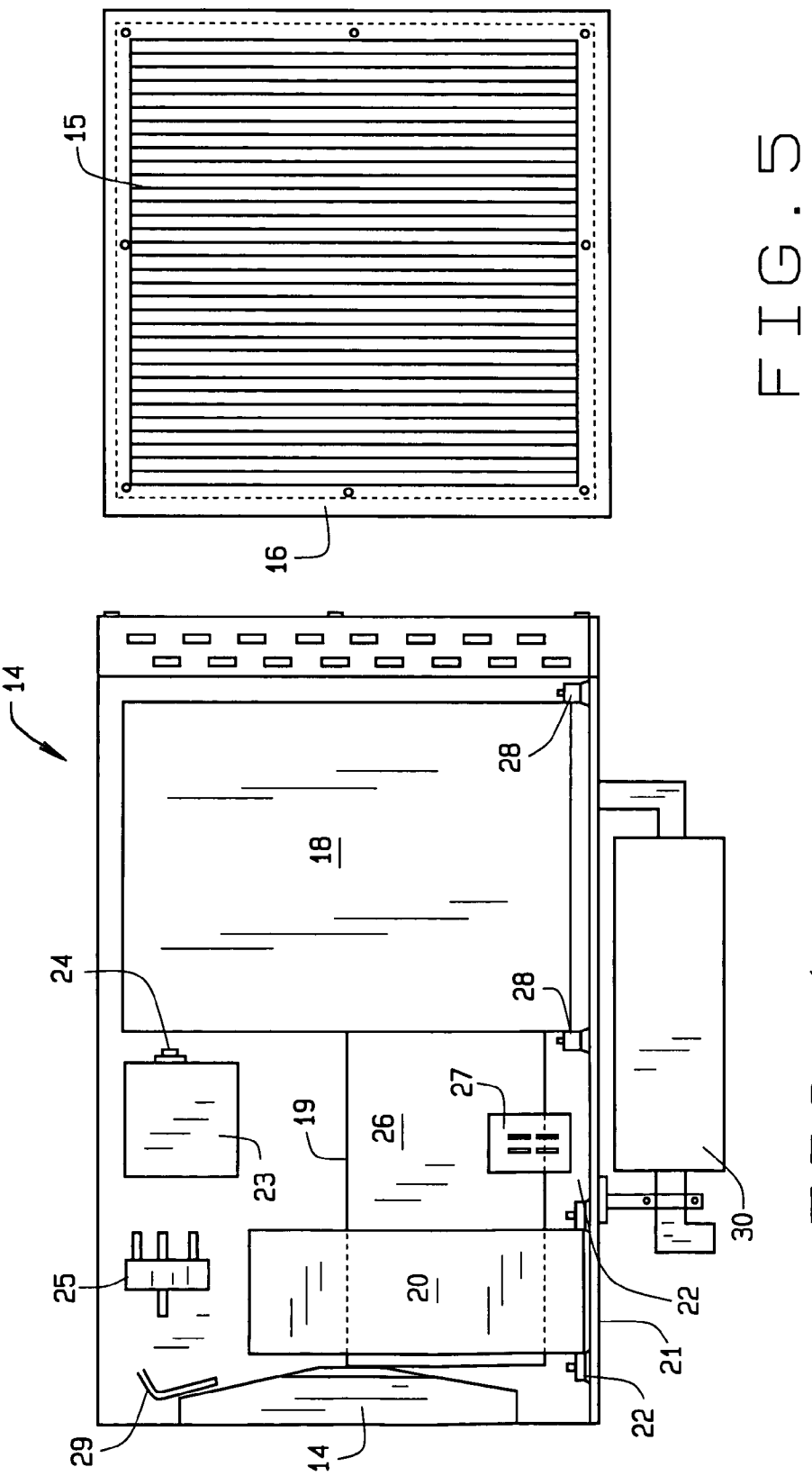

HEATING AND COOLING SYSTEM

CROSS REFERENCE TO RELATED APPLICATION

This patent application claims priority from a provisional application having Ser. No. 60/505,722 and filed on Sep. 25, 2003.

BACKGROUND OF THE INVENTION

This invention relates generally to heating and cooling systems for vehicles and specifically to systems which operate from an auxiliary power generator system. The present invention provides DC power for battery charging, controls the vehicle environment for the truck, camper, van, or bus driver and boater while he operates the vehicle and during down time, all the while in compliance with the anti-idling laws.

Various heating and cooling systems and their generator are currently manufactured for tractor trailers. Other vehicles, such as buses, boats, houseboats, camping trailers, and the like, also have heating and cooling systems, and auxiliary components. The currently available systems are generally too large, too heavy, overpowering in operation, and expensive to purchase and to operate. For example, some of the existing models have components that may utilize thirteen to fifteen horsepower from twin cylinder water cooled diesel engines. Specifications also indicate that a generator with a heating and cooling system normally produces approximately 6 kilowatts of power.

These heating and cooling systems and generator units fasten or bolt to the truck frame rails, between the fuel tank and the rear wheels. The units weigh approximately 450 lb to 500 lb, which consumes more fuel just to carry that weight when the vehicle moves. The condensing unit has condensing coils, a condenser fan and motor, and a refrigerant compressor. These sizable components occupy significant space proximate to a vehicle or truck cab. The condensing unit bolts to the back of the vehicle or truck cab. The evaporator unit has a blower housing, a drain pan, an evaporator coil, an evaporator motor and blower, and the electric heating unit or hot water heating coil for both heating and cooling of the vehicle.

These are examples of the systems that are currently available. The prior art systems are significantly large, heavy, and overpowered in cooling or heating capacity, for the cab in which they are employed. The overpowering applies to many vehicles: truck cabs, refrigerated truck housings, busses, camper vans, mobile units, cabin cruiser boats, and the like.

SUMMARY OF THE INVENTION

Therefore, the subject matter of this invention provides adequate heating and cooling capacity for a truck, van, boat, houseboat, or other vehicle. The invention has a compact size that allows for a more efficient, less costly instillation, and improved fuel economy with reduced air pollution, during operation of the invention.

The current invention is heating and cooling system that operates as a single structure or two units. The structure incorporates a heat pump that in the cooling mode operates conventionally. The air is drawn from outside the unit, through its internal condenser coils, where the heat is removed, and exhausted out the opposite side of the unit, by a condenser fan. In the heating cycle, the condenser motor blower stops and reverses in operation. The outside air is drawn in by the condenser fan, circulates across the diesel engine and generator before being blown through the condenser coils, and then delivered to the outside of the unit. In the heating cycle, a circuit monitors the temperature of the condenser coil, and controls the speed of the condenser motor. This heat recovery method allows the system to maintain power input to heat output ratios in excess of 2:1, even below 40° F. This also allows the system to operate without the need for defrost cycles. Once wasted as a byproduct of the diesel engine and generator, heat is recovered and utilized in this more efficient system. This allows the system to provide the auxiliary power, block heater power, and battery charging power using a smaller diesel engine and generator.

Hence, it is an object of this invention to provide adequate heating and cooling capacity, for a truck/sleeper cab combination, which may be employed in other types of vehicles, whether wheeled, tracked, over-the-road, or aquatic.

Another object of this invention is to provide 120 volt AC power that efficiently operates a truck engine block heater during cold weather.

Another object of this invention is to provide means within a heating and cooling system as the system operates, the means provides auxiliary power for small appliances within a sleeper cab unit, such as a refrigerator, computer, television, and the like.

Still another object of this invention is to provide sufficient 12 volt DC power to maintain the charge in the vehicle's batteries to sustain operations and auxiliary components.

Still another object of this invention is to provide a heating and cooling system of compact size, allowing for a more efficient, less costly instillation, for various types of vehicles.

Yet another object of this invention is to provide a heating/cooling system that operates upon less horsepower, thereby enhancing fuel economy and reducing air pollution.

Other objects may become more apparent to those skilled in the art upon review of the invention as summarized herein, and upon undertaking a study of the description its preferred embodiment, in light of the drawings.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

Variations and modifications to the subject matter of this invention may occur to those skilled in the art upon review of the development as described herein. Such variations, if within the spirit of this development, are intended to be encompassed within the scope of the invention as described.

BRIEF DESCRIPTION OF THE DRAWINGS

In referring to the drawings,

FIG. 3 is a right side view of the evaporator unit of this invention;

FIG. 4 is a longitudinal section view of the power generator and condenser unit for the present invention;

FIG. 5 is a right end view of the unit of FIG. 4;

The same reference numerals refer to the same parts throughout the various figures.

DESCRIPTION OF THE PREFERRED EMBODIMENT

Figure 1:
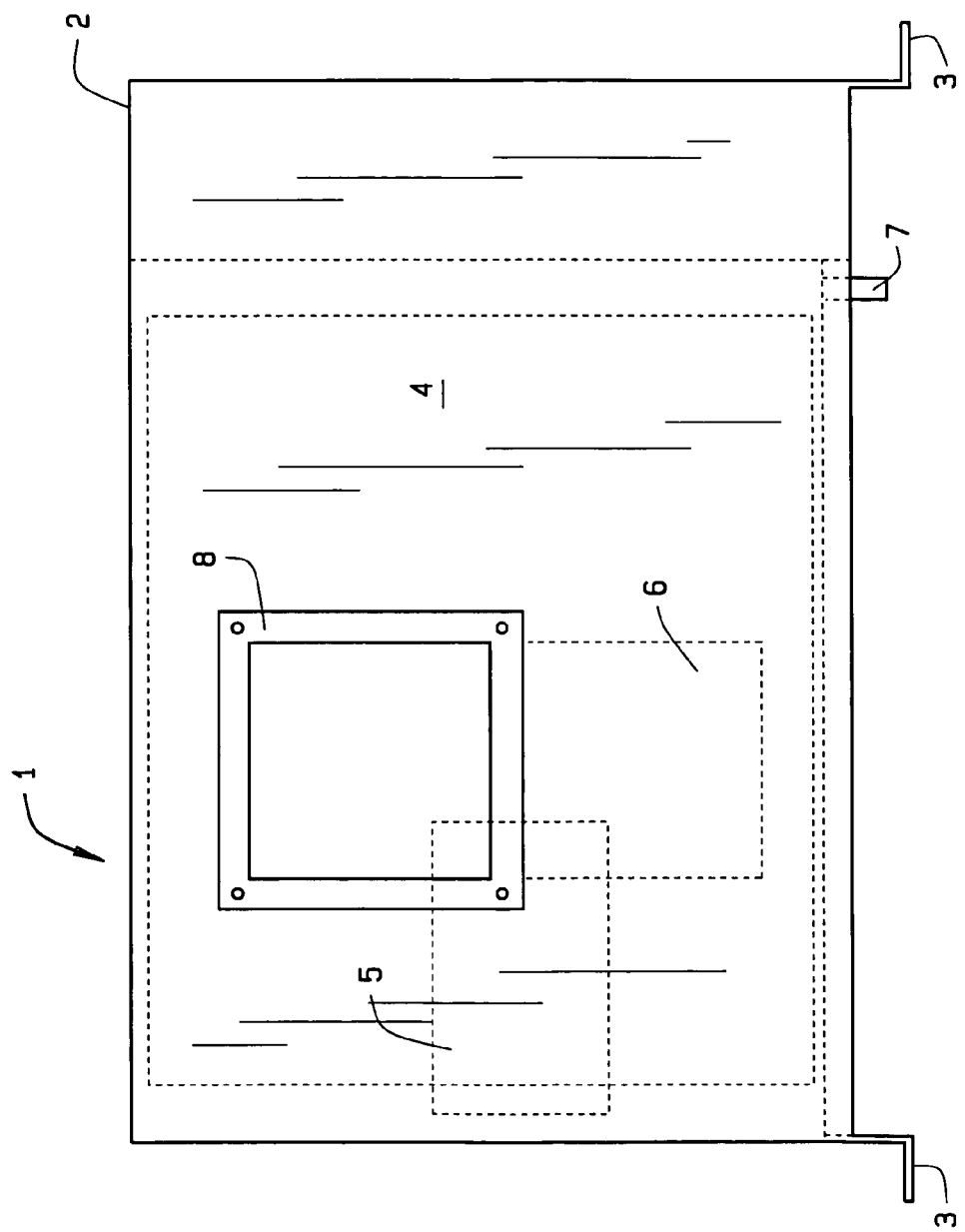
FIG. 1 is a front view of the evaporator unit of the heating and cooling system of the present invention.

In referring to the drawings, and in particular FIG. 1, the heating/cooling system of this invention is shown at 1. The evaporator unit is encased within a housing 2, and has base angles, as at 3, at each corner of the housing, to provide for securement by fasteners of the unit to a stable framework. As the evaporator unit for the system it includes an evaporator coil 4, a motor 5, and a blower 6, that is operated by the motor. Normally the blower has a capacity of approximately 275 cubic feet per minute depending upon the needs of the system and its location. An evaporator drain 7 is located at the housing's 2 bottom to discharge any water collected. An access door 8 allows for servicing. Venting is provided through the housing 2 to a vehicle cab, or confined space, at locations convenient for installation as well as door 8.

Figure 2:
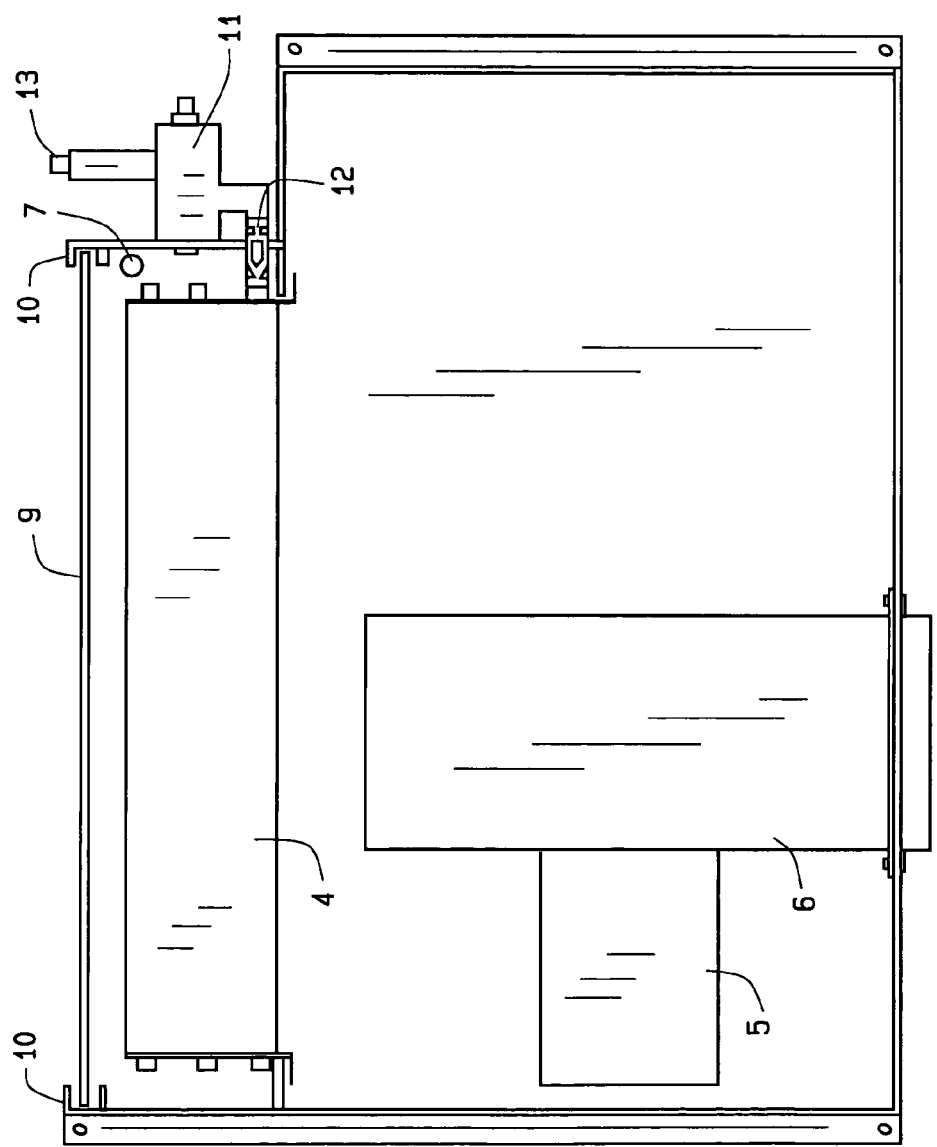
FIG. 2 is a plan view thereof.

FIG. 2 provides a top plan view of the evaporator unit of FIG. 1. As can be seen, the evaporator motor 5 operates on approximately 115 volt service. The evaporator coil 4 also shown in FIG. 3 has its location as noted. A filter 9, which may comprise a foam, fibrous, or any type of material is shown fixed in position by frame 10. A flare connector and process valve 11 mounts to the frame, and a check and metering valve 12, associated with the coils 4 precedes valve 11. The evaporator drain tube 7 is proximate to the check valve 12 and the evaporator outlet valve 13 connects with the valve 11.

FIG. 3, as previously explained shows the right side view of the evaporator unit as previously described in FIG. 2. Its various operative components, as previously explained, are shown as applied thereto. The evaporator outlet valve 31 in FIG. 3 may also function as a low pressure connector.

The power generator and condenser unit 14 is shown generally in FIG. 4. The right end view of the unit, as later disclosed in FIG. 5, provides a grid work 15 for the unit embodied within a framework 16 and fabricated from aluminum, polymer, or other non-corrosive material. Other components include a condenser fan 17, which is mounted upon the wall opposite from the grid work 15, a 12 volt DC motor powered fan and assembly operated with a reversing relay and a motor speed control. In addition, compressor 20 mounts to the base 21 of the unit by the cushioning means or feet 22. In a further embodiment, the compressor 20 is a 115 volt AC service powered compressor, with a 12,000 BTU-R22 capacity. Other capacities of the compressor may be used. The wiring for the system is located within the junction box 23, and safety switches may be employed, such as a high temperature thermal limit switch 24. Furthermore, a heat pump reversing valve 25 is employed, and in the preferred embodiment it may operate from 24 volt AC power.

A generator unit 26, operates with the diesel engine 18 in the preferred embodiment, may comprise a 115 volt AC service unit, with a 12 volt DC output. An outlet box 27 is furnished and is used in combination with the auxiliary power unit, to heat the block, and operates upon 115 volt AC current.

As previously described, the diesel engine 18 provides the motive power for this generator unit 14, and in the preferred embodiment, may comprise a ten horsepower electric start diesel engine. The engine 18 also mounts by means of cushioning devices 28, as noted.

In conjunction with the pump reversing valve 25, a thermistor sensor 29 controls the condenser speed of this unit. Also, to reduce noise, a low noise muffler 30 may be employed.

Figure 7:
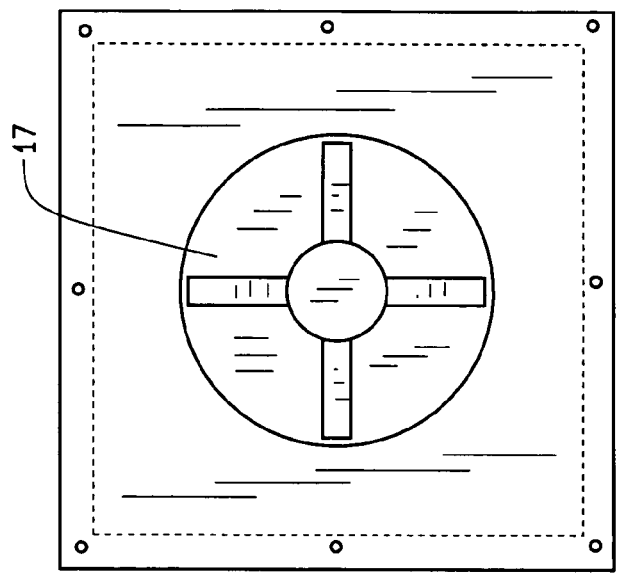
FIG. 7 is a left end view of the unit of FIG. 6.
Figure 6:
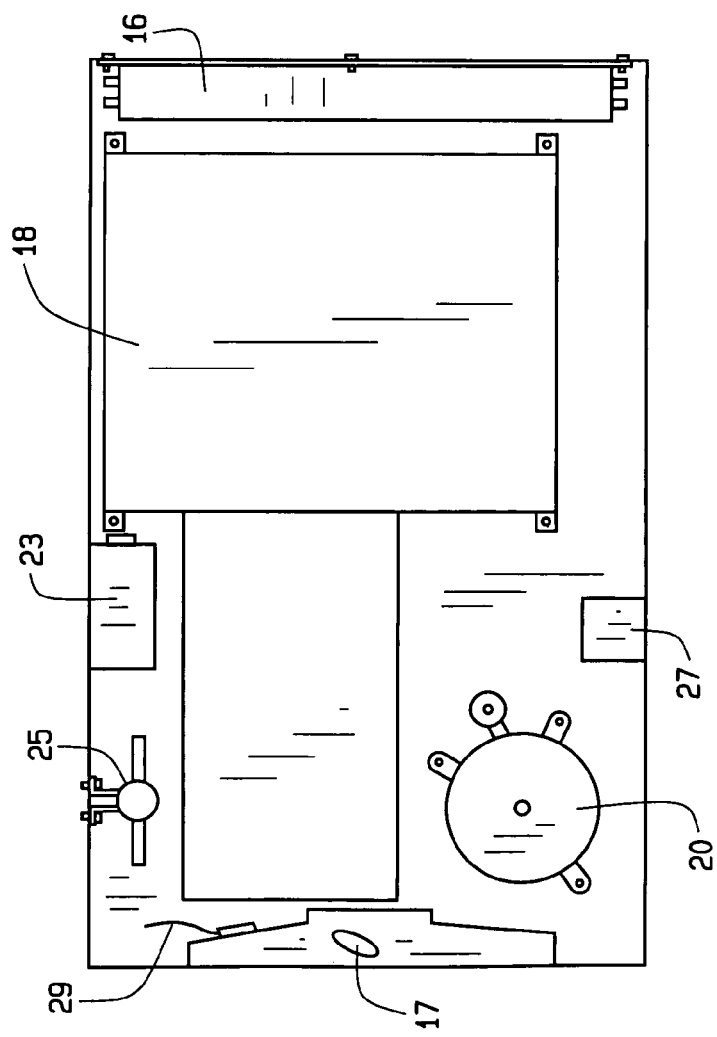
FIG. 6 is a plan view of the power generator and condenser unit of FIG. 4.

FIG. 6 discloses the top view of the unit 1, and the arrangement and location of the various components are provided. In addition, FIG. 7 provides a left end view, showing the location of the condenser fan 17.

Figure 8:
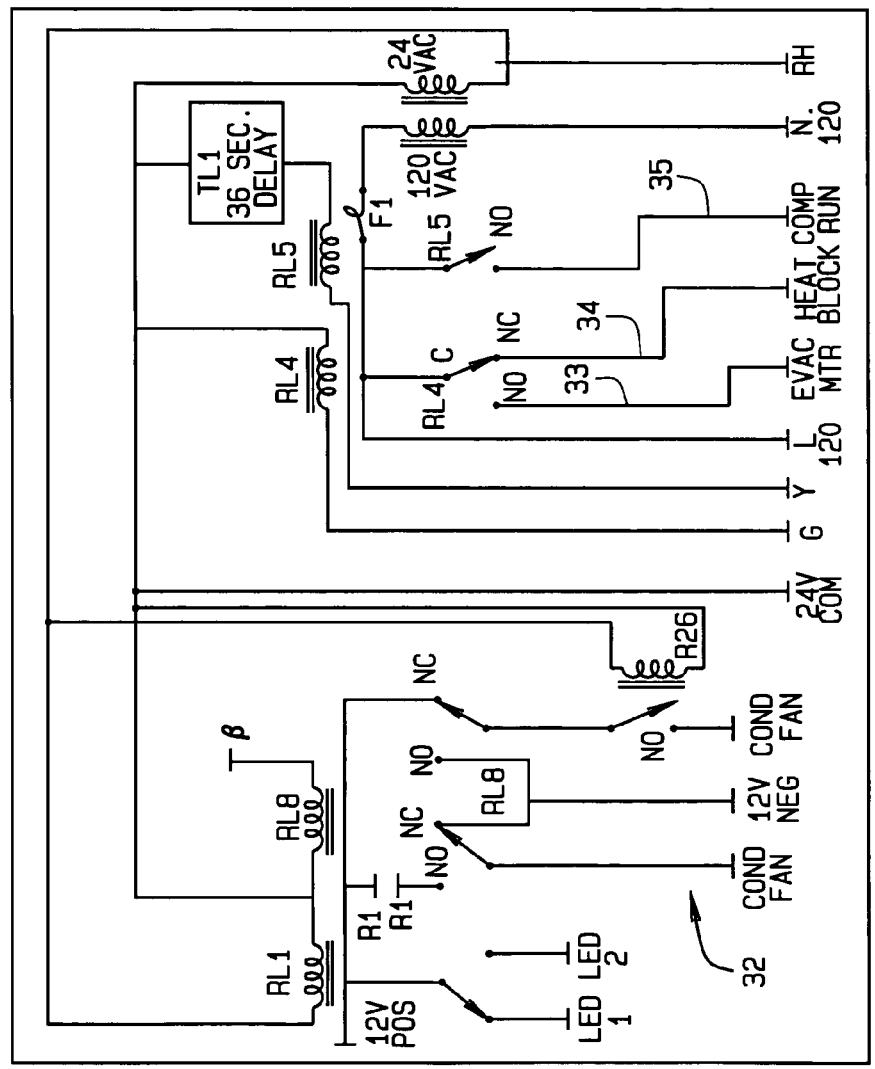
FIG. 8 shows the circuit diagram for powering the diesel heat pump.
Figure 9:
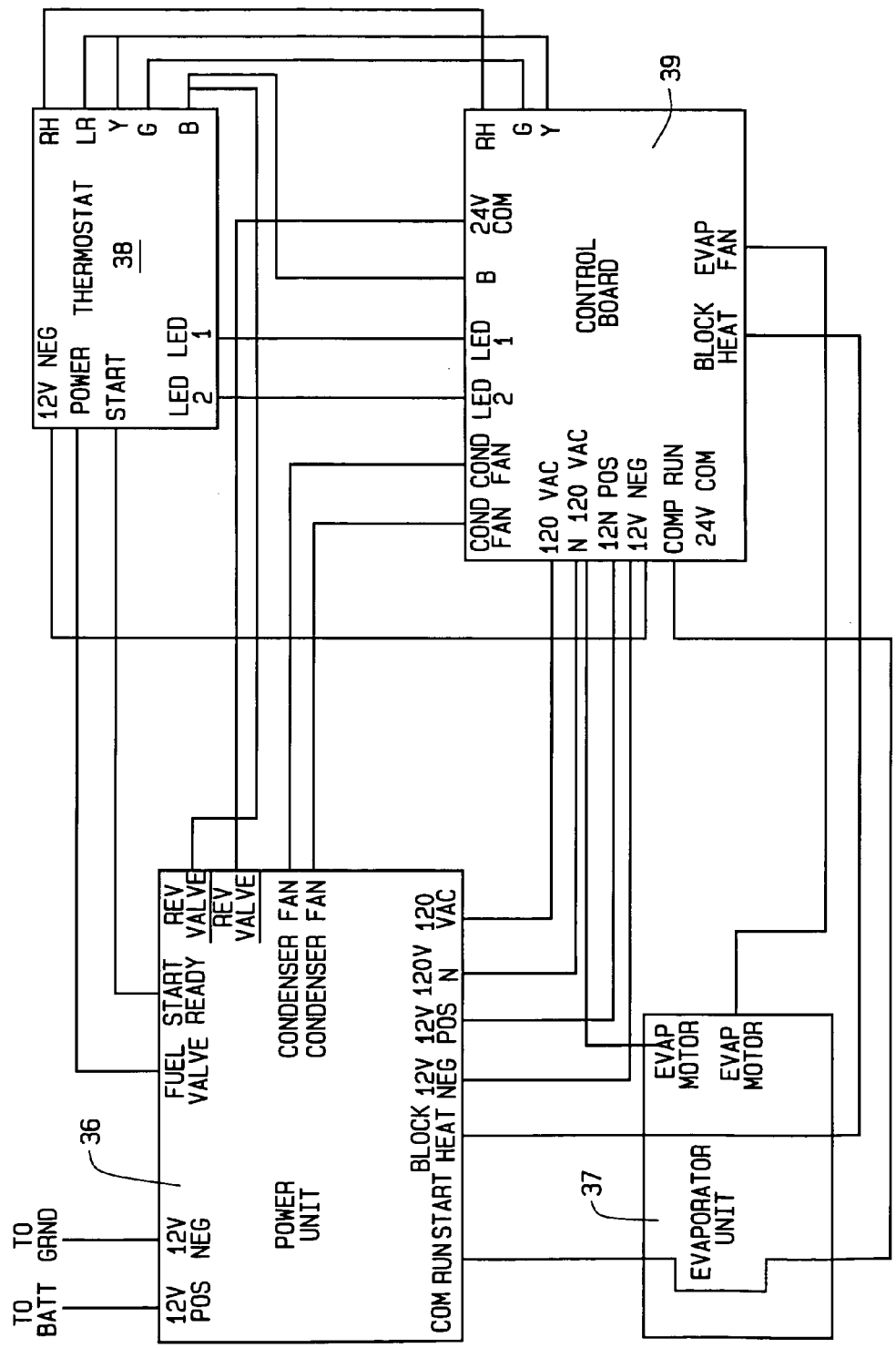
FIG. 9 is a block diagram of the wiring for the diesel heat pump of this invention; and, FIG. 10 is a circuit diagram of the diesel powered heat pump and power generator for this invention.
Figure 10:
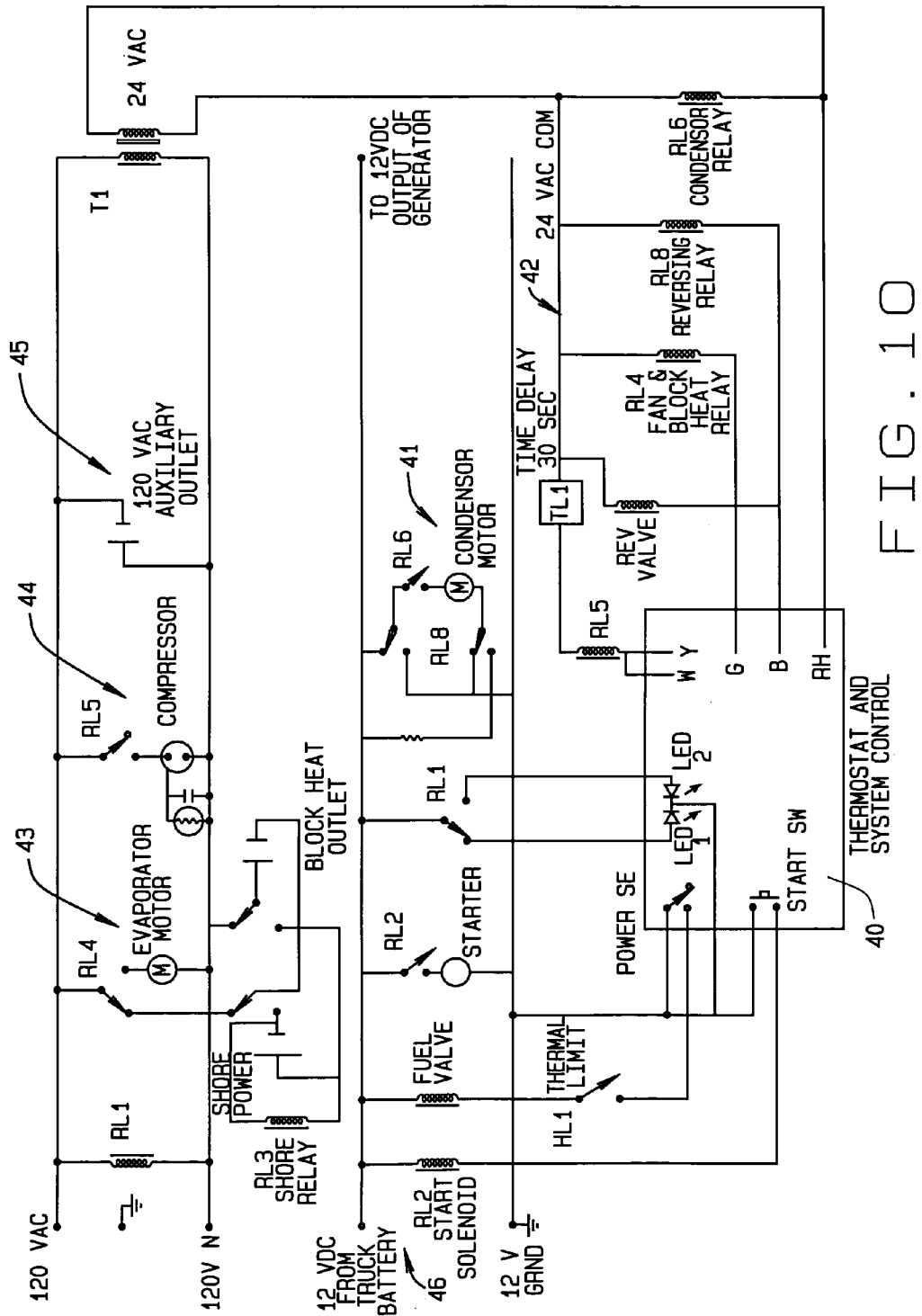

The various circuits for this device can be seen in FIGS. 8–10. As disclosed in FIG. 8, the circuitry for controlling the diesel heat pump and control board includes the controls for the condenser fan, as noted at circuit 32, in addition to the switches that control the operations of the evaporator motor, circuit 33, the block heater outlet, circuit 34, and the compressor, as shown at circuit 35.

FIG. 9 discloses the block wiring diagram for the diesel heat pump of this invention. The power unit of the circuit 36 comprises a computer chip that regulates the operations of the unit. The computer component for operations of the evaporator unit is shown at 37. The thermostat that regulates the operations of the device, for start or end, can be seen at 38. The control board 39 also comprising a computer chip, provides a system for circuit leads that coordinate these various components during operation of this invention.

FIG. 10 discloses the schematic diagram for the diesel powered heat pump/power generator for the invention. This includes the thermostat 40 which controls the system 1, (White Rogers Model No. 1F86-244). The circuitry that operates the condenser motor is shown at 41. Various relays, a reversing relay, a fan, and a block heater relay, and reversing valve relay, are shown at 42. The circuit for operating the evaporator motor can be seen at 43, the circuit for operating the compressor is shown at 44, and an auxiliary power outlet, 120 volts AC, can be seen at 45. The electrical input from the truck battery can be seen at 46.

The controlling relays, switches, thermostats and associated circuits can be replaced with an electronic central processing unit utilizing solid state sensors relays, and switches. The various other components that provide operation to the system can be noted, within this schematic diagram.

The operations of this system and initial testing of the generator and air conditioning show that a generator of 3500 watts, and an air conditioner of 10,000 BTU, supplies adequate cooling for a truck, or other vehicle, and sleeper unit combination. A 3500 watt generator, however, may not be sufficient to supply electric heat, block heat, auxiliary power, and to charge a battery. To provide for all the power requirements in the heating cycle, a more efficient method of heating has been developed by the present invention. The heat pump is very efficient at temperatures down to 40° F., but at lower temperatures auxiliary heating is needed to maintain proper heat output and comfort. Also, energy wasting defrost cycles keep the condenser coil free of frost. These cycles can reduce the efficiency of the generated heat from the system. To overcome the deficiencies in conventional heat pumps, this invention incorporates a unique heat recovery method that maintains very high efficiencies at much colder outdoor temperatures, and eliminates the need for a defrost cycle.

This method of recovering byproduct heat and eliminating energy wasting heat cycles is new and unique in an air over heat pump system. Other benefits from this system include a much smaller size used in tight quarters that prohibit the larger prior art systems. The lighter weight of this invention prevents ticketing for vehicle gross weight violations. Better fuel economy occurs with a 30% reduction of horsepower, as this system uses less fuel, reduces air pollution, and saves money. Increased efficiency occurs in colder temperatures than with conventional heat pumps. The present invention is also cost effective with an initial cost lower than existing systems, reducing its payback time, and enhancing long-term profits for the vehicle owner or operator. The present invention, because of its compact size and reduced weight also requires a shorter installation time. This system can be installed in four man-hours, versus the prior art which can take up to twenty four man-hours. This decreased installation lowers costs, and also down time for the truck. As a smaller unit, the present invention reduces air and noise pollution. Furthermore, the lower weight of the present invention reduces wear and tear on the truck frame and the load on its main engine. The present invention eliminates idling time due to heating and cooling of the cab as experienced with current systems.

Other applications for this particular invention, the diesel heat pump heating and cooling system may include buses, both private and touring, boats, small cruisers, houseboats, and the like, to provide for ambient temperature control, and a more comfortable level in the cold of winter or the heat of summer. The present invention can be placed in vacation cabins, where utility service is unavailable or too costly, in emergency shelters, in homes for emergency power, heat, and air conditioning, and in camping trailers or motor homes. The present invention may be used in any type of mobile unit for vending purposes. Finally, the units could have military applications in wheeled, tracked, or armored vehicles such as tanks, armored personal carriers, mobile hospitals, mobile command centers, and the like as well as naval vessels and certain aviation uses.

This particular system has a variety of configurations that adapt to any one of the previously defined vehicles or facilities. It can be designed as a split system, diesel powered unit, or integrated into a single unit, but yet still be compact for ease of installation and usage. Furthermore, it is a self-contained unit, where the compressor, power generator, evaporator, fuel tank, and battery combine into one assembly. It may operate upon diesel fuel, gasoline, propane, or even fuel cells, currently of interest to conservation groups. The heat generated by the fuel cells returns to the present invention through a heat recovery design for reuse.

Variations and modifications to the subject matter of this invention may occur to those skilled in the art upon review of the invention as described herein. Such variations, if within the spirit of this development, are intended to be encompassed within the scope of this invention as described. The description of the preferred embodiment and its disclosure within the drawings are set forth for illustrative purposes only.

We claim:

1. A system for conditioning the atmosphere of an enclosed space, such as a vehicle, a truck, a boat, or a temporary building, comprising:

a power unit, having an engine, an electric generator turned by said engine, a means to transfer heat, and having wiring, outlets, a battery connected to said engine, controls, and a housing;

an evaporator unit, having a blower, a motor for said blower, an evaporator coil plumbed to said heat transfer means, and having wiring, a filter ahead of said coil, and a housing encasing said evaporator unit and having a service door; and, one or more electronic circuits connecting said power unit and said evaporator;

whereby, said power unit operates said engine to turn said generator thus powering said heat transfer means and said power unit attaches to said enclosed space;

whereby, said evaporator unit operates electrically from said generator to add heat to said enclosed space upon said controls calling for heat or to cool said enclosed space upon said controls calling for cooling;

whereby, said power unit is less than two feet in length, width, or height and said evaporator unit is less than three feet in length, width, or height;

thus, said system cools or heats the atmosphere of an enclosed space independently of the power for the enclosed space;

wherein said heat transfer means having a gridwork in communication with the atmosphere, a compressor that compresses a refrigerant, a condenser fan powered by an electric motor, a condenser coil, a reversing valve plumbed with said compressor, and a thermistor sensor controlling the speed of said compressor;

whereby for heating said enclosed space, said condenser fan draws air into said power unit, over said compressor and said engine, passing through said condenser coil heating said refrigerant and through said gridwork, and said refrigerant passes through said evaporator coil over which said blower moves air from the enclosed space for heating; and, whereby for cooling said enclosed space, said blower draws air from said enclosed space over said evaporator coil heating a refrigerant then sent to said condenser coil and said condenser fan blows atmospheric air over said condenser coil cooling the refrigerant later compressed in said compressor, and returned to said evaporator unit to cool said enclosed space.

2. The atmosphere conditioning system of claim 1 wherein said heat transfer means is a heat pump and said blower motor reverses direction in coordination with said controls and said heat pump.

3. The atmosphere conditioning system of claim 2 wherein said engine produces at least eight horsepower, said blower produces at least 250 cubic feet per minute air movement, said generator produces at least 3000 watts of electricity in the form of at least 100 volts alternating current and in the form of at least 12 volts direct current, and said compressor operates upon approximately 115 volts alternating current using R-22 refrigerant resulting in at least 10,000 BTU capacity.

4. The atmosphere conditioning system of claim 3 wherein said power unit, provides one or more outlets for operation of auxiliary electrical devices including an engine block heater;

electrically connects with the starting system of a vehicle;

recharges said battery of said power unit; and, electrically starts said engine.

5. The atmosphere conditioning system of claim 1 wherein said engine is powered by diesel fuel, gasoline, propane, natural gas, or fuel cells.

6. The atmosphere conditioning system of claim 1 wherein said power unit and said evaporator unit are located separately from each other about said enclosed space.

7. The atmosphere conditioning system of claim 1 wherein said power unit and said evaporator unit are located adjacent to each other upon said enclosed space.

8. The atmosphere conditioning system of claim 4 further comprising:

a first circuit for controlling said condenser fan, said blower motor, said outlets and said controls including a microprocessor and said thermistor; and, a second circuit for controlling said engine, said evaporator unit, said controls, one or more relays, and said thermistor.

* * * * *